(12) United States Patent
Kuhl

(10) Patent No.: US 9,795,872 B2
(45) Date of Patent: Oct. 24, 2017

(54) EXERCISE SYSTEM

(71) Applicant: Travis Kuhl, Glen Burnie, MD (US)

(72) Inventor: Travis Kuhl, Glen Burnie, MD (US)

( * ) Notice: Subject to any disclaimer, the term of this patent is extended or adjusted under 35 U.S.C. 154(b) by 188 days.

(21) Appl. No.: 14/743,361

(22) Filed: Jun. 18, 2015

(65) Prior Publication Data

US 2016/0367890 A1 Dec. 22, 2016

(51) Int. Cl.
| | |
|---|---|
| *A63F 9/24* | (2006.01) |
| *A63F 13/21* | (2014.01) |
| *A63B 71/06* | (2006.01) |
| *G05G 9/047* | (2006.01) |
| *A63F 13/98* | (2014.01) |
| *A63B 22/02* | (2006.01) |
| *A63B 22/06* | (2006.01) |

(52) U.S. Cl.
CPC .......... *A63F 13/21* (2014.09); *A63B 71/0622* (2013.01); *A63F 13/98* (2014.09); *G05G 9/047* (2013.01); *A63B 22/02* (2013.01); *A63B 22/06* (2013.01); *A63B 22/0664* (2013.01); *A63B 2071/0625* (2013.01); *A63B 2071/0658* (2013.01); *A63B 2225/09* (2013.01); *A63B 2225/20* (2013.01); *A63B 2225/50* (2013.01)

(58) Field of Classification Search
CPC ...... A63F 2300/1062; A63F 2300/8017; A63F 13/21; A63F 13/23; A63F 13/42
See application file for complete search history.

(56) References Cited

U.S. PATENT DOCUMENTS

| | | | |
|---|---|---|---|
| 4,542,897 A * | 9/1985 | Melton | A63F 9/143 463/29 |
| 5,362,069 A | 11/1994 | Hall-Tipping | |
| 5,568,928 A | 10/1996 | Munson et al. | |
| D375,531 S | 11/1996 | Visser | |
| 5,591,104 A * | 1/1997 | Andrus | A61B 5/6887 434/247 |
| 5,645,513 A | 7/1997 | Haydocy et al. | |
| 5,690,582 A * | 11/1997 | Ulrich | A63B 22/02 482/4 |
| 6,283,896 B1* | 9/2001 | Grunfeld | A63B 22/02 482/54 |
| 6,413,191 B1* | 7/2002 | Harris | G07F 17/32 273/138.1 |
| 8,672,812 B2 | 3/2014 | Dugan | |
| 2002/0055422 A1 | 5/2002 | Airmet et al. | |
| 2006/0223634 A1* | 10/2006 | Feldman | A63B 21/0023 463/36 |
| 2006/0252543 A1* | 11/2006 | Van Noland | A63B 22/00 463/37 |
| 2007/0123390 A1* | 5/2007 | Mathis | A63B 24/0084 482/8 |
| 2008/0146336 A1 | 6/2008 | Feldman et al. | |

(Continued)

FOREIGN PATENT DOCUMENTS

WO WO2005868866 9/2005

*Primary Examiner* — Steve Rowland

(57) ABSTRACT

An exercise system for combining video game play with physical exercise includes an exercise machine that has a pair of handles. A gaming console is attached to the exercise machine. The gaming console is positioned on the handles such that the gaming console is accessible while the exercise machine is utilized. The gaming console stores electronic video games thereby facilitating video game play while exercising.

11 Claims, 5 Drawing Sheets

(56) References Cited

U.S. PATENT DOCUMENTS

| | | | |
|---|---|---|---|
| 2009/0011907 A1* | 1/2009 | Radow | A63B 21/00181 |
| | | | 482/57 |
| 2010/0216600 A1* | 8/2010 | Noffsinger | A63B 23/12 |
| | | | 482/5 |
| 2010/0267519 A1 | 10/2010 | Johnson, II | |
| 2010/0279823 A1 | 11/2010 | Waters | |
| 2011/0237396 A1* | 9/2011 | Lu | A63B 71/0619 |
| | | | 482/1 |
| 2012/0264568 A1* | 10/2012 | Allowitz-Thompson | |
| | | | G06F 19/3481 |
| | | | 482/4 |
| 2016/0038785 A1* | 2/2016 | Netter | A63B 22/0235 |
| | | | 482/4 |

* cited by examiner

EXERCISE SYSTEM

BACKGROUND OF THE DISCLOSURE

Field of the Disclosure

The disclosure relates to exercise devices and more particularly pertains to a new exercise device for combining video game play with physical exercise.

SUMMARY OF THE DISCLOSURE

An embodiment of the disclosure meets the needs presented above by generally comprising an exercise machine that has a pair of handles. A gaming console is attached to the exercise machine. The gaming console is positioned on the handles such that the gaming console is accessible while the exercise machine is utilized. The gaming console stores electronic video games thereby facilitating video game play while exercising.

There has thus been outlined, rather broadly, the more important features of the disclosure in order that the detailed description thereof that follows may be better understood, and in order that the present contribution to the art may be better appreciated. There are additional features of the disclosure that will be described hereinafter and which will form the subject matter of the claims appended hereto.

The objects of the disclosure, along with the various features of novelty which characterize the disclosure, are pointed out with particularity in the claims annexed to and forming a part of this disclosure.

BRIEF DESCRIPTION OF THE DRAWINGS

The disclosure will be better understood and objects other than those set forth above will become apparent when consideration is given to the following detailed description thereof. Such description makes reference to the annexed drawings wherein.

DESCRIPTION OF THE PREFERRED EMBODIMENT

Figure 1:
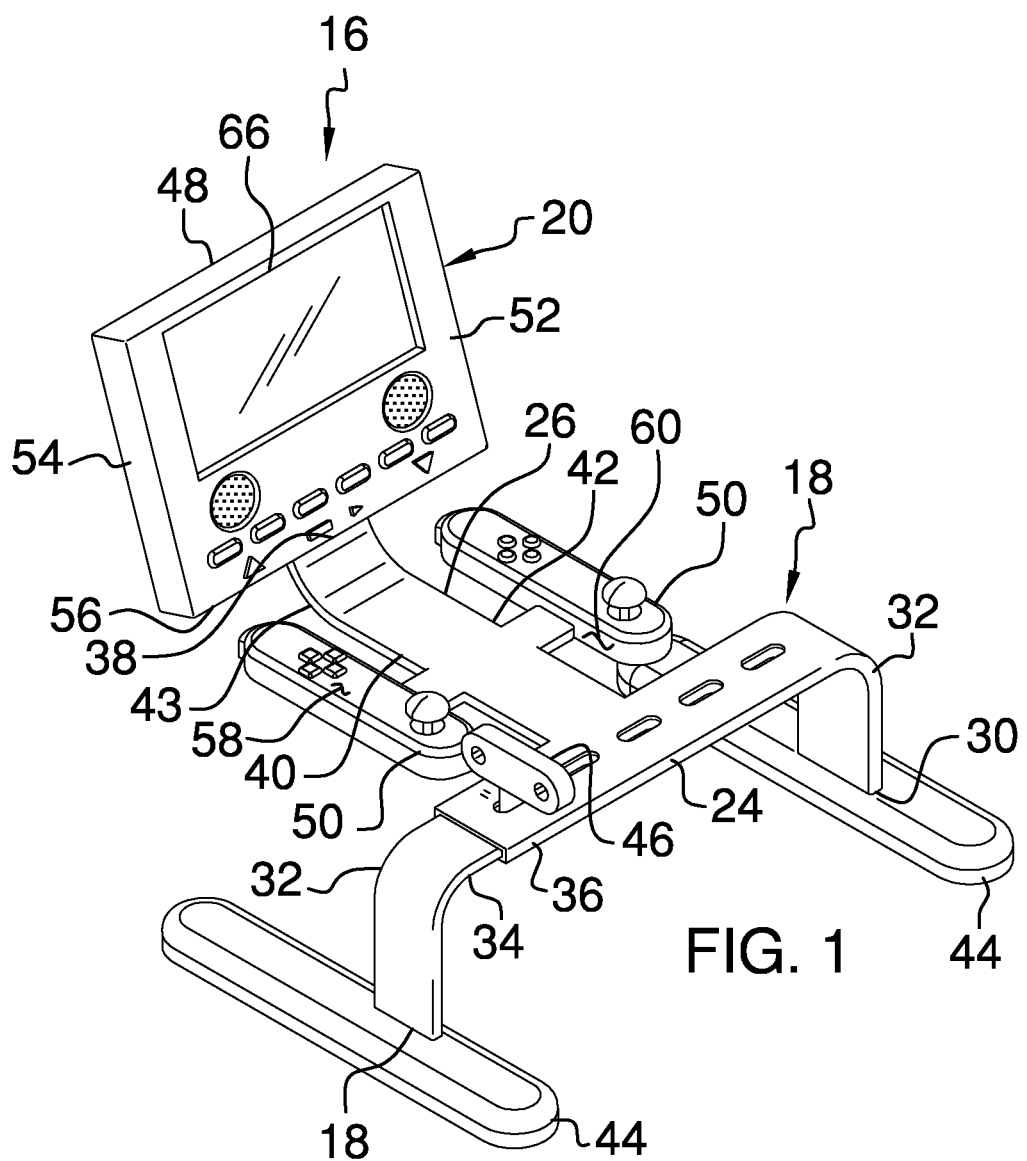
FIG. 1 is a perspective view of an exercise system according to an embodiment of the disclosure.
Figure 2:
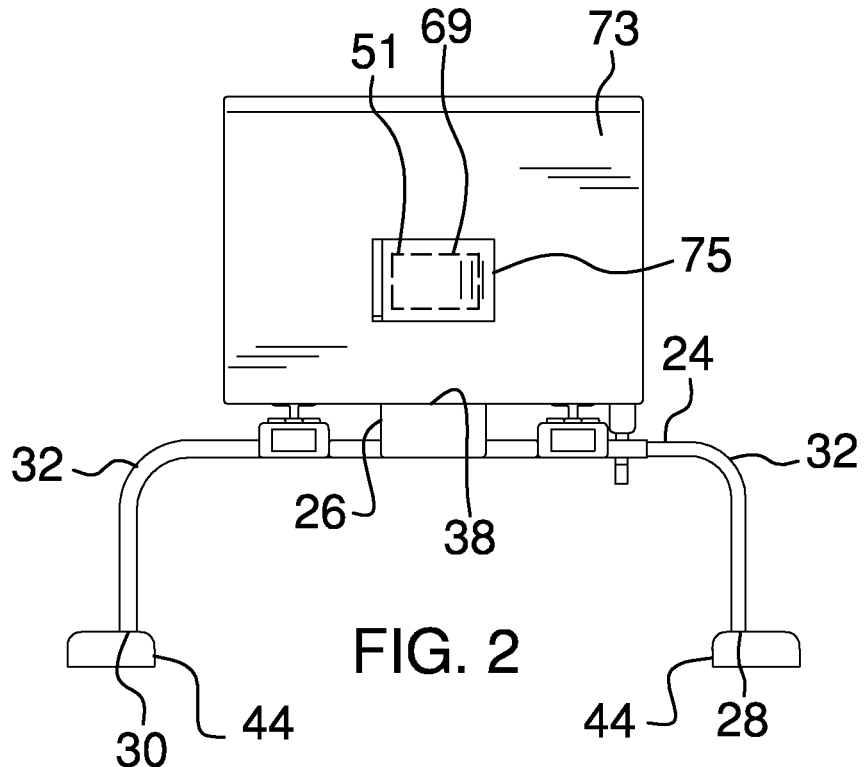
FIG. 2 is a back view of an embodiment of the disclosure.
Figure 3:
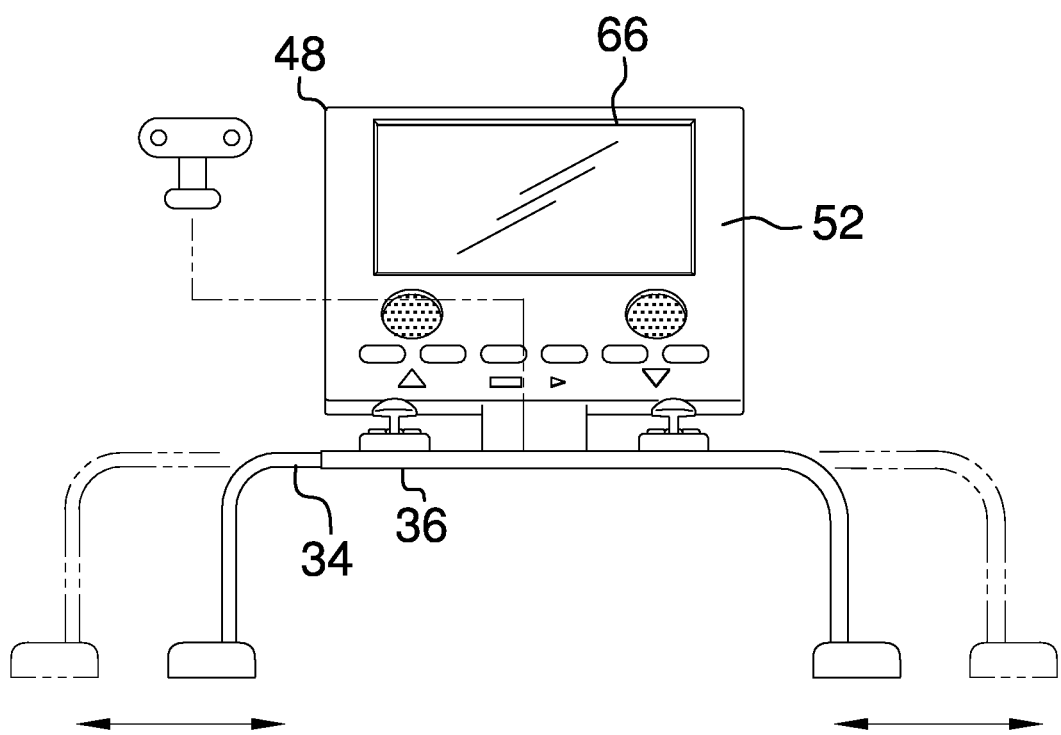
FIG. 3 is a front view of an embodiment of the disclosure.
Figure 4:
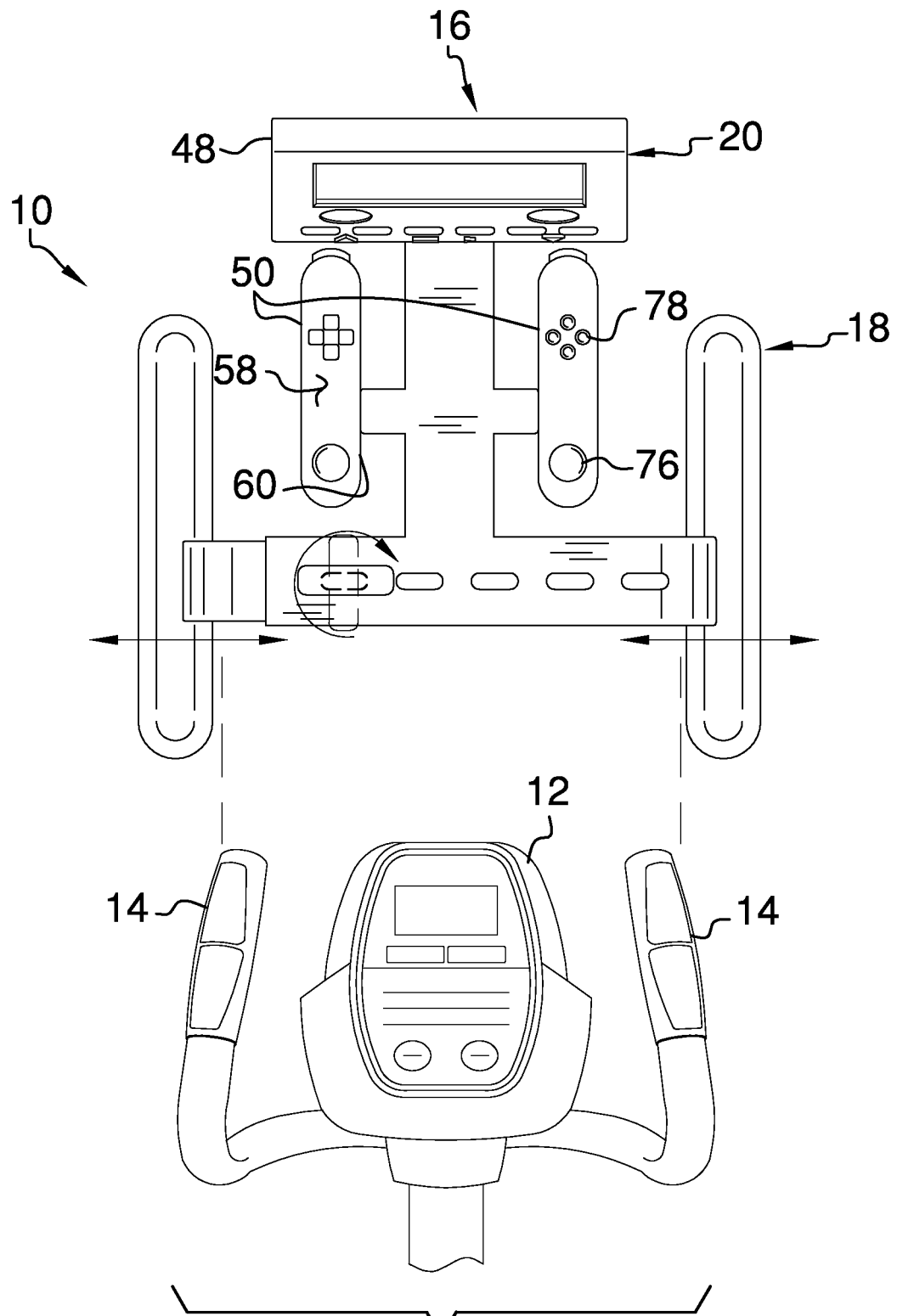
FIG. 4 is a top view of an embodiment of the disclosure.
Figure 5:
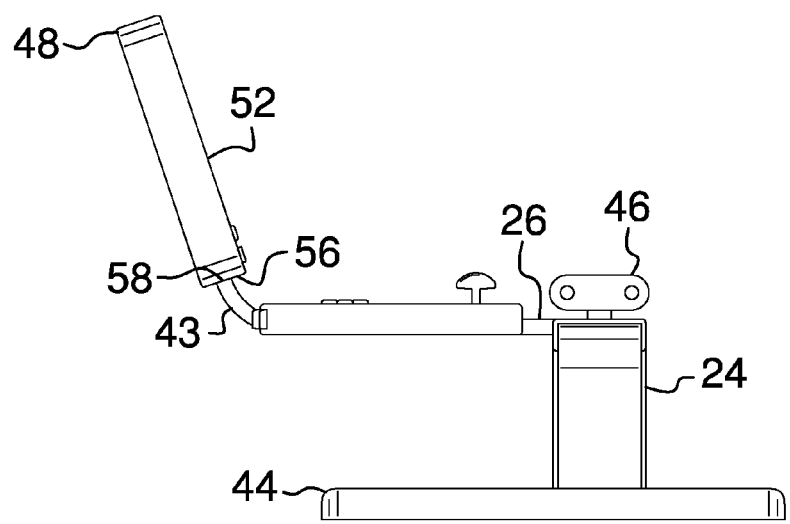
FIG. 5 is a left side view of an embodiment of the disclosure.
Figure 6:
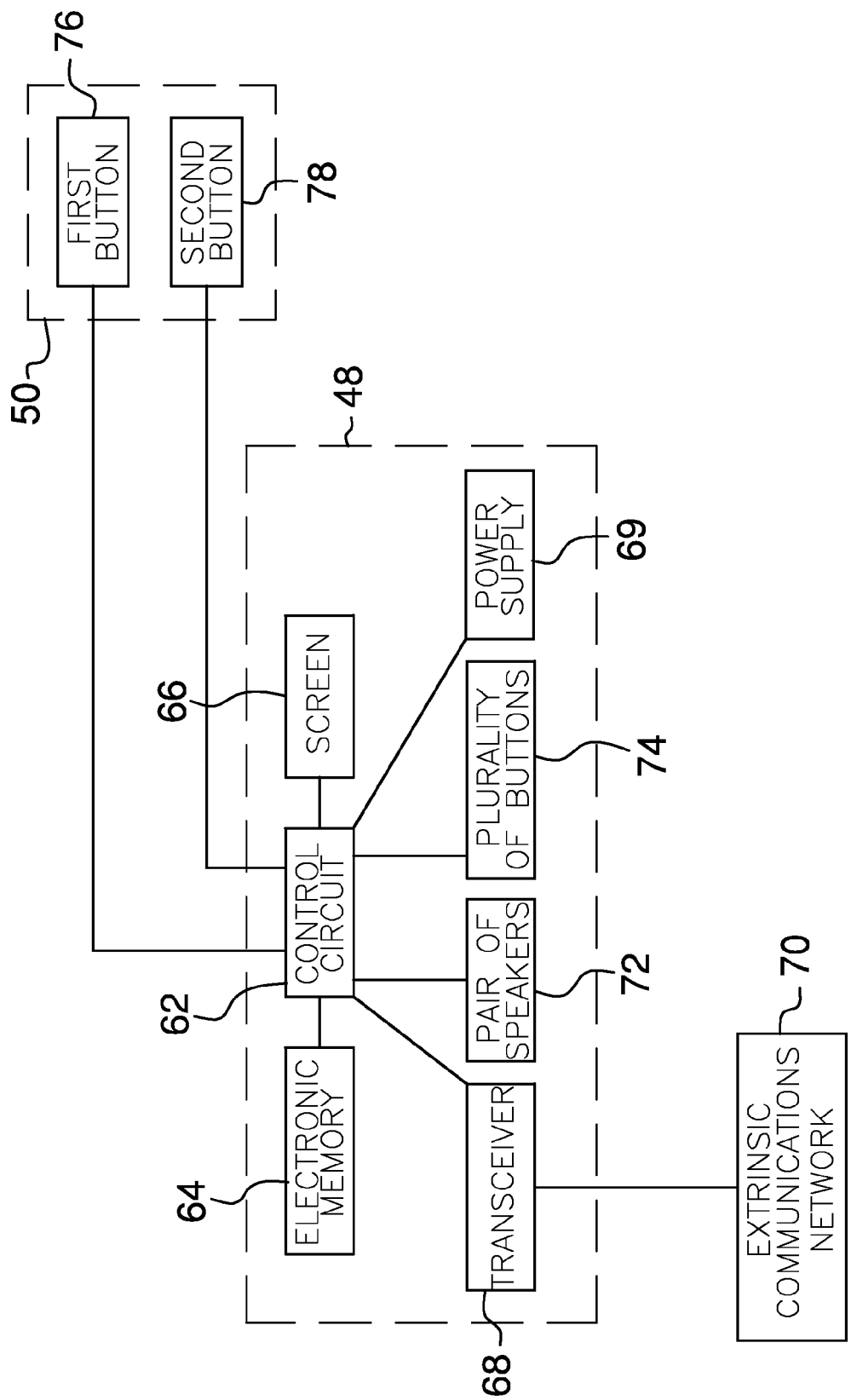
FIG. 6 is a schematic view of an embodiment of the disclosure.

With reference now to the drawings, and in particular to FIGS. 1 through 6 thereof, a new exercise device embodying the principles and concepts of an embodiment of the disclosure and generally designated by the reference numeral 10 will be described.

As best illustrated in FIGS. 1 through 6, the exercise system 10 generally comprises an exercise machine 12 that has a pair of handles 14. The exercise machine 12 may be a treadmill, a stationary bike, an elliptical machine or other exercise machine utilized in the convention of cardiovascular conditioning. A gaming console 16 is provided and the gaming console 16 is attached to the exercise machine 12. The gaming console 16 is positioned on the handles 14 such that the gaming console 16 is accessible while the exercise machine 12 is utilized. The gaming console 16 stores electronic video games thereby facilitating video game play while exercising.

The gaming console 16 comprises a mount 18 and an interface 20. The mount 18 comprises a first arm 24 and a second arm 26. The first arm 24 is oriented transverse to the second arm 26 such that the mount 18 is substantially T-shaped. The first arm 24 has a first end 28 and a second end 30 and the first arm 24 has a pair of bends 32 thereon. The bends 32 are spaced apart from each other such that the first arm 24 has a U-shape having each of the first end 28 and the second end 30 being directed downwardly with respect to the second arm 26.

The first arm 24 includes a first section 34 that is slidably coupled to a second section 36. Thus, the first end 28 and the second end 30 are positionable a selected distance apart from each other. The second arm 26 has a distal end 38 with respect to the first arm 24, a first lateral edge 40 and a second lateral edge 42. The second arm 26 has a bend 43 thereon that is positioned proximate the distal end 38. Thus, the distal end 38 is directed upwardly with respect to the first arm 24.

A pair of feet 44 is provided and each of the feet 44 is coupled to an associated one of the first end 28 and the second end 30. Each of the feet 44 is removably attached to an associated one of the handles 14 such that the mount 18 is retained on the handles 14. A lock 46 is rotatably attached to the first arm 24. The lock 46 is positioned on the first section 34 such that the lock 46 selectively engages the second section 36. Thus, the lock 46 retains the first arm 24 at a selected length.

The interface 20 comprises a display 48 and a pair of controls 50. The display 48 has a front side 52 and a peripheral edge 54 and the peripheral edge 54 has a lower side 56. The lower side 56 is coupled to the distal end 38 of the second arm 26 such that the front side 52 is accessible to a user. Each of the controls 50 has a top surface 58 and a mating surface 60. The mating surface 60 of each of the controls 50 is attached to an associated one of the first lateral edge 40 and the second lateral edge 42 of the second arm 26. Thus, each of the controls 50 is positioned between the display 48 and the first arm 24.

The display 48 includes a control circuit 62 that is positioned within the display 48. The control circuit 62 may comprise an electronic processor or the like that is capable of video game play. An electronic memory 64 is positioned within the display 48 and the electronic memory 64 is electrically coupled to the control circuit 62. The electronic memory 64 may comprise RAM or the like and the electronic memory 64 stores data relating to video games.

A screen 66 is coupled to the front side 52 and the screen 66 is electrically coupled to the control circuit 62 such that the screen 66 may display the video games. The screen 66 may comprise an LCD display or the like. A transceiver 68 is positioned within the display 48 and the transceiver 68 is electrically coupled to the control circuit 62. The transceiver 68 may be in electrical communication with an extrinsic communications network 70 thereby facilitating the transceiver 68 to download data pertaining to the video games into the electronic memory 64. The transceiver 68 may comprise a radio frequency transceiver or the like and the extrinsic communications network may comprise the internet.

A pair of speakers 72 is provided and each of the speakers 72 is coupled to the front side 52. Each of the speakers 72 is electrically coupled to the control circuit 62 such that each of the speakers 72 may emit audio related to the video games. A plurality of buttons 74 is provided and each of the buttons 74 is attached to the front side 52 such that each of the buttons 74 may be manipulated. Each of the buttons 74 is electrically coupled to the control circuit 62 such that each of the buttons 74 controls operational parameters of the control circuit 62.

A power supply 69 is positioned within the display 48 and the power supply 69 is electrically coupled to the control circuit 62. The power supply 69 comprises at least one battery 71. The display 48 has a back side 73 and a battery cover 75 is removably positioned on the back side 73. The power supply 69 is positioned beneath the battery cover 75.

Each of the controls 50 includes a first button 76 that is positioned on the top surface 58 such that the first button 76 may be manipulated. The first button 76 is electrically coupled to the control circuit 62 such that the first button 76 controls aspects of the video game. The first button 76 may comprise a joy stick or the like. A second button 78 is positioned on the top surface 58 such that the second button 78 may be manipulated. The second button 78 is electrically coupled to the control circuit 62 such that the second button 78 may control aspects of the video game. The second button 78 may comprise a directional control or the like.

In use, the first arm 24 is adjusted to the selected width and each of the feet 44 is coupled to the associated handles 14. The controls 50 and the display 48 are utilized to play the video game while simultaneously utilizing the exercise equipment 12. The exercise equipment 12 may be utilized without utilizing the gaming console 16.

With respect to the above description then, it is to be realized that the optimum dimensional relationships for the parts of an embodiment enabled by the disclosure, to include variations in size, materials, shape, form, function and manner of operation, exercise system and use, are deemed readily apparent and obvious to one skilled in the art, and all equivalent relationships to those illustrated in the drawings and described in the specification are intended to be encompassed by an embodiment of the disclosure.

Therefore, the foregoing is considered as illustrative only of the principles of the disclosure. Further, since numerous modifications and changes will readily occur to those skilled in the art, it is not desired to limit the disclosure to the exact construction and operation shown and described, and accordingly, all suitable modifications and equivalents may be resorted to, falling within the scope of the disclosure. In this patent document, the word "comprising" is used in its non-limiting sense to mean that items following the word are included, but items not specifically mentioned are not excluded. A reference to an element by the indefinite article "a" does not exclude the possibility that more than one of the element is present, unless the context clearly requires that there be only one of the elements.

I claim:

1. An exercise system combining elements of video game play and physical exercise, said exercise system comprising:
    an exercise machine having a pair of handles; and
    a gaming console being attached to said exercise machine, said gaming console being positioned on said handles wherein said gaming console is configured to be accessible while said exercise machine is utilized, said gaming console being configured to store electronic video games thereby facilitating video game play while exercising, said gaming console including a mount, said mount comprising a first arm and a second arm, said first arm being oriented transverse to said second arm such that said mount is substantially T-shaped, said first arm having a first end and a second end, said first arm having a pair of bends thereon, said bends being spaced apart from each other such that said first arm has a U-shape having each of said first end and said second end being directed downwardly with respect to said second arm, said first arm including a first section being slidably coupled to a second section such that said first end and said second end are positionable a selected distance apart from each other.

2. The exercise system according to claim 1, wherein said second arm has a distal end with respect to said first arm, a first lateral edge and a second lateral edge, said second arm having a bend thereon being positioned proximate said distal end such that said distal end is directed upwardly with respect to said first arm.

3. The exercise system according to claim 1, wherein said mount further comprises a pair of feet, each of said feet being coupled to an associated one of said first end and said second end, each of said feet being removably attached to an associated one of said handles such that said mount is retained on said handles.

4. The exercise system according to claim 1, wherein said mount further comprises a lock being rotatably attached to said first arm, said lock being positioned on said first section such that said lock selectively engages said second section wherein said lock retains said first arm at a selected length.

5. The exercise system according to claim 1, further comprising:
    a second arm having a distal end; and
    said gaming console comprising an interface, said interface including a display having a front side and a peripheral edge, said peripheral edge having a lower side, said lower side being coupled to said distal end of said second arm wherein said front side is configured to be accessible to a user.

6. The exercise system according to claim 5, wherein said display includes:
    a control circuit being positioned within said display; and
    an electronic memory being positioned within said display, said electronic memory being electrically coupled to said control circuit, said electronic memory being configured to store data relating to video games.

7. The exercise system according to claim 6, wherein said display further includes:
    a screen being coupled to said front side, said screen being electrically coupled to said control circuit wherein said screen is configured to display the video games; and
    a transceiver being positioned within said display, said transceiver being electrically coupled to said control circuit, said transceiver being configured to be in electrical communication with an extrinsic communications network thereby facilitating said transceiver to download data pertaining to the video games into said electronic memory.

8. The exercise system according to claim 6, wherein said display further includes:
    a pair of speakers, each of said speakers being coupled to said front side, each of said speakers being electrically coupled to said control circuit wherein each of said speakers is configured to emit audio related to the video games;
    a plurality of buttons, each of said buttons being attached to said front side wherein each of said buttons is configured to be manipulated, each of said buttons being electrically coupled to said control circuit wherein each of said buttons controls operational parameters of said control circuit; and a power supply being positioned within said display, said power supply being electrically coupled to said control circuit, said power supply comprising at least one battery.

9. The exercise system according to claim 1, further comprising:
a second arm having a first lateral edge and a second lateral edge;
a first arm
a display being coupled to said second arm; and
said gaming console comprising an interface, said interface including a pair of controls, each of said controls having a top surface and a mating surface, said mating surface of each of said controls being attached to an associated one of said first lateral edge and said second lateral edge of said second arm, each of said controls being positioned between said display and said first arm.

10. The exercise system according to claim 9, further comprising:
a control circuit; and
each of said controls further including:
a first button being positioned on said top surface wherein said first button is configured to be manipulated, said first button being electrically coupled to said control circuit wherein said first button is configured to control aspects of the video game; and
a second button being positioned on said top surface wherein said second button is configured to be manipulated, said second button being electrically coupled to said control circuit wherein said second button is configured to control aspects of the video game.

11. An exercise system combining elements of video game play and physical exercise, said exercise system comprising:
an exercise machine having a pair of handles;
a gaming console being attached to said exercise machine, said gaming console being positioned on said handles wherein said gaming console is configured to be accessible while said exercise machine is utilized, said gaming console being configured to store electronic video games thereby facilitating video game play while exercising, said gaming console comprising a mount and an interface, said mount comprising:
a first arm,
a second arm, said first arm being oriented transverse to said second arm such that said mount is substantially T-shaped, said first arm having a first end and a second end, said first arm having a pair of bends thereon, said bends being spaced apart from each other such that said first arm has a U-shape having each of said first end and said second end being directed downwardly with respect to said second arm, said first arm including a first section being slidably coupled to a second section such that said first end and said second end are positionable a selected distance apart from each other, said second arm having a distal end with respect to said first arm, a first lateral edge and a second lateral edge, said second arm having a bend thereon being positioned proximate said distal end such that said distal end is directed upwardly with respect to said first arm,
a pair of feet, each of said feet being coupled to an associated one of said first end and said second end, each of said feet being removably attached to an associated one of said handles such that said mount is retained on said handles, and
a lock being rotatably attached to said first arm, said lock being positioned on said first section such that said lock selectively engages said second section wherein said lock retains said first arm at a selected length;
said interface comprising a display and a pair of controls, said display having a front side and a peripheral edge, said peripheral edge having a lower side, said lower side being coupled to said distal end of said second arm wherein said front side is configured to be accessible to a user, each of said controls having a top surface and a mating surface, said mating surface of each of said controls being attached to an associated one of said first lateral edge and said second lateral edge of said second arm, each of said controls being positioned between said display and said first arm, said display including:
a control circuit being positioned within said display,
an electronic memory being positioned within said display, said electronic memory being electrically coupled to said control circuit, said electronic memory being configured to store data relating to video games,
a screen being coupled to said front side, said screen being electrically coupled to said control circuit wherein said screen is configured to display the video games,
a transceiver being positioned within said display, said transceiver being electrically coupled to said control circuit, said transceiver being configured to be in electrical communication with an extrinsic communications network thereby facilitating said transceiver to download data pertaining to the video games into said electronic memory,
a pair of speakers, each of said speakers being coupled to said front side, each of said speakers being electrically coupled to said control circuit wherein each of said speakers is configured to emit audio related to the video games,
a plurality of buttons, each of said buttons being attached to said front side wherein each of said buttons is configured to be manipulated, each of said buttons being electrically coupled to said control circuit wherein each of said buttons controls operational parameters of said control circuit, and
a power supply being positioned within said display, said power supply being electrically coupled to said control circuit, said power supply comprising at least one battery;
each of said controls including:
a first button being positioned on said top surface wherein said first button is configured to be manipulated, said first button being electrically coupled to said control circuit wherein said first button is configured to control aspects of the video game, and
a second button being positioned on said top surface wherein said second button is configured to be manipulated, said second button being electrically coupled to said control circuit wherein said second button is configured to control aspects of the video game.

* * * * *